(12) United States Patent
Melgaard et al.

(10) Patent No.: US 12,070,027 B2
(45) Date of Patent: Aug. 27, 2024

(54) ONE WAY DOOR ANIMAL EXCLUDER WITH PLATED COIL SPRING DOOR HINGE

(71) Applicant: InnoTrap, LLC, Towaco, NJ (US)

(72) Inventors: Brian Melgaard, Boonton, NJ (US); Robert Downing Trafford, West Caldwell, NJ (US); Joel S. Marks, Sherman Oaks, CA (US)

(73) Assignee: InnoTrap, LLC, Towaco, NJ (US)

( * ) Notice: Subject to any disclaimer, the term of this patent is extended or adjusted under 35 U.S.C. 154(b) by 335 days.

(21) Appl. No.: 17/553,338

(22) Filed: Dec. 16, 2021

(65) Prior Publication Data

US 2023/0189789 A1 Jun. 22, 2023

(51) Int. Cl.
*A01M 23/18* (2006.01)
*A01M 29/30* (2011.01)

(52) U.S. Cl.
CPC ............ *A01M 23/18* (2013.01); *A01M 29/30* (2013.01)

(58) Field of Classification Search
CPC .................................................... A01M 23/18
See application file for complete search history.

(56) References Cited

U.S. PATENT DOCUMENTS

| | | | | |
|---|---|---|---|---|
| 3,823,504 A | * | 7/1974 | Dosch | A01M 23/18 43/61 |
| 4,912,872 A | * | 4/1990 | Wynn | A01M 23/18 43/60 |
| 5,862,624 A | * | 1/1999 | Askins | A01M 23/20 43/60 |
| 2009/0211146 A1 | * | 8/2009 | Radesky | A01M 23/18 43/61 |
| 2013/0174469 A1 | * | 7/2013 | Kittelson | A01M 23/18 43/61 |
| 2020/0344995 A1 | * | 11/2020 | Gauker | A01M 23/18 |

* cited by examiner

*Primary Examiner* — Jessica B Wong
(74) *Attorney, Agent, or Firm* — Rankin, Hill & Clark LLP

(57) ABSTRACT

A one way door animal excluder includes an elongated enclosure to support a door within. The door pivots between an open and a closed position wherein an animal can push the door open from only one side. A top plate is fitted atop the enclosure and crimped at flanges of the top plate, with at least one flange also crimped around a hinge wire of the door to form a pivotal attachment of the door to the enclosure. The top plate includes an opening with tabs extending therein to form a spring mandrel to support a torsion spring. The torsion spring biases the door to close. The spring includes a loosely wound coil that may be temporarily compressed to install upon the tabs. An upward extending hump of the top plate is positioned adjacent to the spring coil to protect the spring coil structure.

18 Claims, 3 Drawing Sheets

US 12,070,027 B2

ONE WAY DOOR ANIMAL EXCLUDER WITH PLATED COIL SPRING DOOR HINGE

BACKGROUND OF INVENTION

Field of Invention

The present invention relates to animal control. More precisely, the invention relates to improvements in one way door animal excluders.

Brief Description of Related Art

Pest animals can take residence in spaces they are not welcome through an opening or other access space. An attic or crawl space is a common example. Such spaces may not be suitable nor accessible for use of live traps since it may be impractical to retrieve the trap. One option is a one way door animal excluder, or "excluder" used at the animal's access opening. The animal, or family thereof, exits but cannot re-enter.

In structure, an excluder typically includes an elongated enclosure with hinged flaps at a front end. The enclosure is often made of a cage wire mesh construction. The flaps enable attaching to a wall or the like that includes the access opening. The flaps also extend to fully cover a typical opening to guide the animal into the enclosure. Within the enclosure is a hinged door biased to swing across the interior to selectively block the enclosure. The door is angled in a manner that the animal can easily push the door, usually upward, to exit while the door shuts to prevent travel in the opposite direction. Normally the bias is from a door spring. In this manner the door acts as a one way valve to limit travel to one direction. Since the animals must leave the residence space at some point, they will eventually all be evacuated.

In prior excluders the door spring is mounted coaxially with a cross wire of the door, where the cross wire comprises or is near to the door hinge. FIGS. 1 and 2 show a typical prior art excluder including enclosure 200 and flaps 220. Spring 240 is mounted coaxially to door cross wire 235. For such mounting wire 235 must be cut, bent at a segment, and the spring placed upon the wire segment. The wire is then re-bent to its original straight position. Cross wire 235 may also be entirely installed after the spring, wherein the entire wire is welded to the door after the door is made. Either secondary operation is labor intensive. Spring 240 pivots about the cross wire to spread at legs 241 and 242 against respective structures of the excluder. The coils of spring 240 are tight against each other as is typical of prior torsion springs.

With respect to the prior art door hinge, the door is typically attached to a wire of the cage (such as wire 234) via a crimped hinge clip 215. The clip is typically not rotationally fixed and the respective door and hinge wires are partly free move around each other. As a result door 230 has free play to move side to side. Such looseness can lead to irregular function. Top plate 210 is held to enclosure 200 by crimped tabs 214. These tabs must be assembled and crimped in a separate operation from that of hinge clips 215.

BRIEF SUMMARY OF THE INVENTION

Animals may use an opening to enter an enclosed area within which they are normally not welcome. A one way door animal excluder selectively blocks this access opening. The excluder acts as a one-way travel valve that allows passage in only a single direction. An elongated enclosure supports a door within where the door pivots between an open and a closed position wherein an animal can push the door open from only one side. A top plate is fitted atop the enclosure and crimped to the enclosure at flanges of the top plate, with at least one flange also crimped around a hinge wire of the door to form a pivotal attachment of the door to the enclosure. The top plate includes an opening with tabs extending therein to form a spring mandrel to support a torsion spring. The torsion spring biases the door to close. The spring includes a loosely wound coil that may be temporally compressed to install upon the tabs. An upward extending hump of the top plate is positioned adjacent to the spring coil to protect the spring coil structure.

DETAILED DESCRIPTION OF THE PREFERRED EMBODIMENTS

Figure 3:
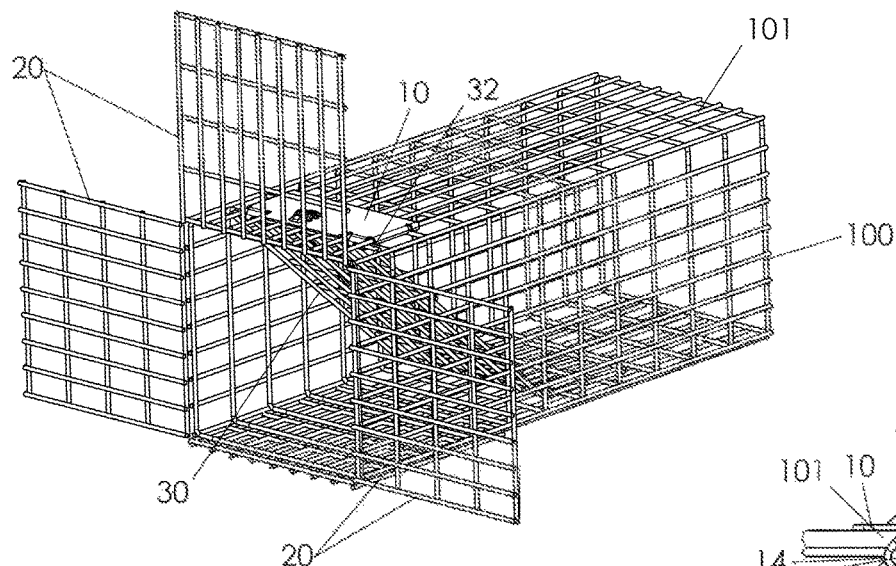
FIG. 3 is an end perspective view of an embodiment of an excluder of the invention.

FIG. 3 shows an exemplary one way door animal excluder device. Enclosure 100 is preferably an elongated wire mesh cage, square or rectangular in section as shown. The enclosure is open at a front and a rear end to form a passageway there through. Other constructions of the enclosure may be used such as sheet metal. Flaps 20 are preferably arranged around the open front of the enclosure. As shown, two side flaps and a top flap are deployed while a bottom flap 20 is stowed. Door 30 extends rearward and downward to a lowest normal operative position from hinge, or hinge wire, 32 at ceiling or roof 101 to selectively and functionally close or block the passageway to prevent passage by a target animal. The horizontal orientation shown is suited for use on an opening in a wall or similar animal access area. The enclosure may be mounted by other orientations, including for example with the front facing upward for an opening in a ceiling or downward for an opening in a floor. In either the downward or horizontal orientation the weight of the door will assist in retaining the door in its normal closed condition. This is seen for example in FIG. 13 where the opened door is gravity biased to move downward. In an upward orientation the door will be gravity biased toward the open condition.

Figure 1:
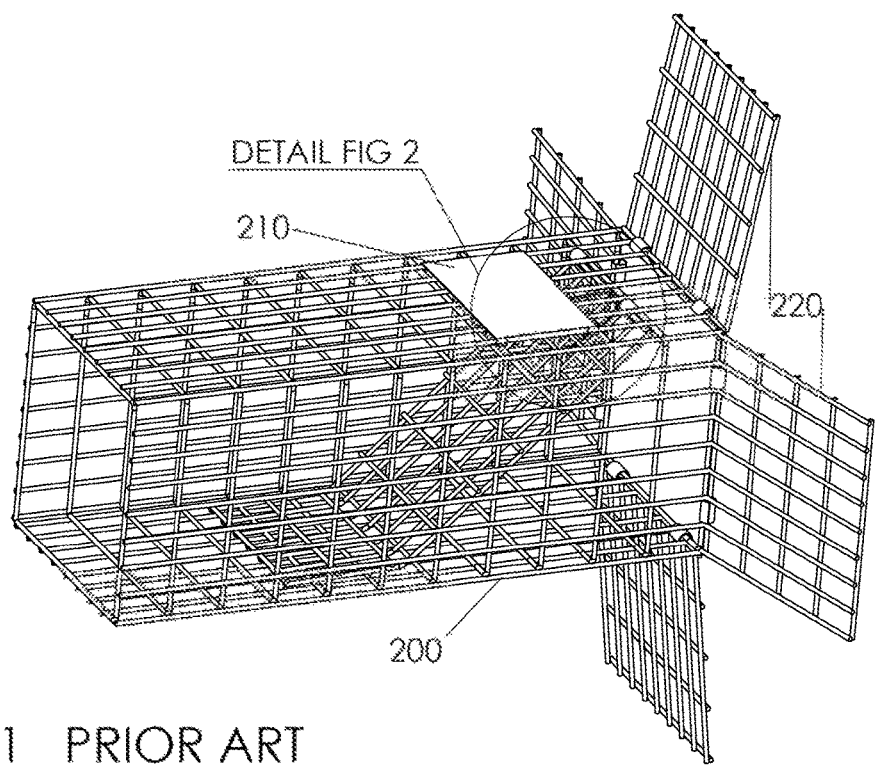
FIG. 1 is a side, top perspective view of a prior art excluder.
Figure 2:
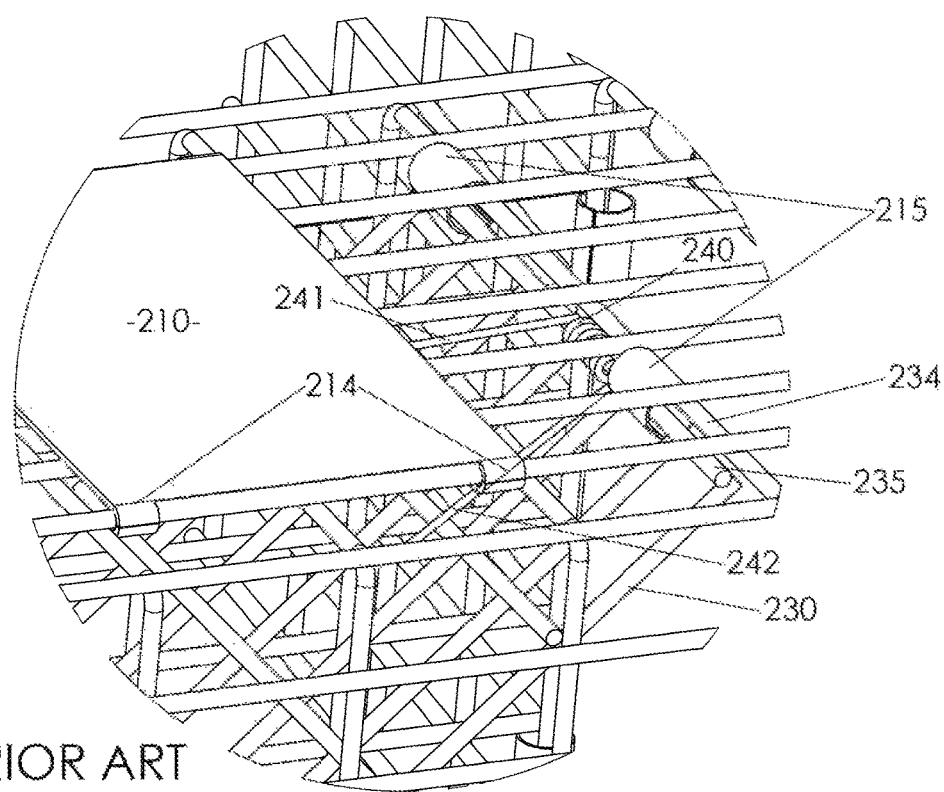
FIG. 2 is a detail views of the prior art excluder of FIG. 1.
Figure 13:
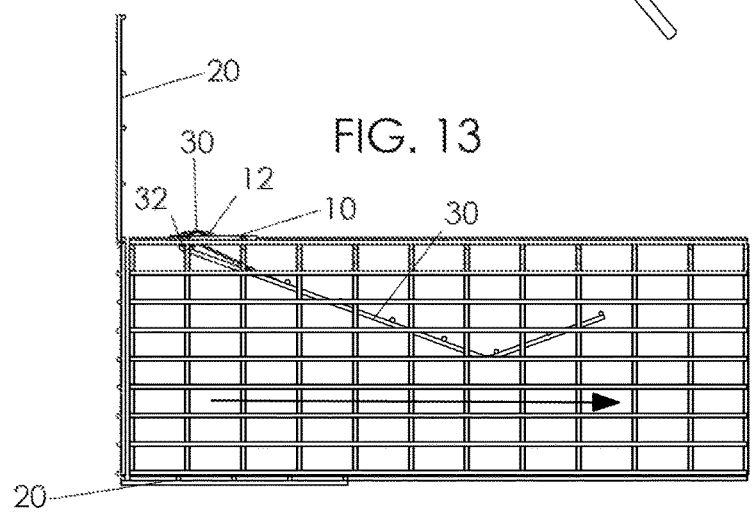
FIG. 13 is a side elevation view of the excluder of FIG. 3 in a door-opened condition.

To ensure reliable operation the door should be biased to close by a spring or equivalent resilient element. With the door held open the animal is free to pass and exit as shown at the arrow in FIG. 13. In FIG. 13 the door is not moved to its upper most possible position against the ceiling. But it is functionally open to enable passage by a target animal since it is moved upward far enough from its closed position by the animal to enable such passage. A common such animal without limitation is a squirrel. Door 30 will close after the exit to the condition of FIG. 1 so that there is no reentry possible. Accordingly the door should be in its full down position without a gap at the bottom; spring 30 ensures this is the case.

Flaps 20 may be selectively deployed to provide attachment points to the target structure. The flaps also selectively extend the area blocked by the excluder to cover openings larger than just the cross sectional area of the enclosure.

Figure 5A:
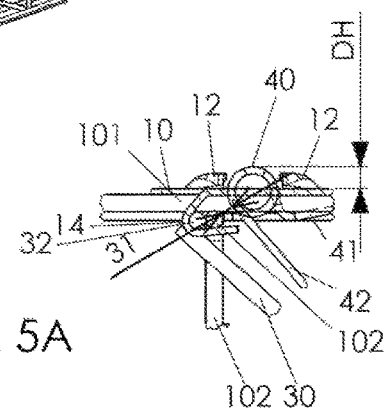
FIG. 5A is detail view of the excluder of FIG. 5.
Figure 4:
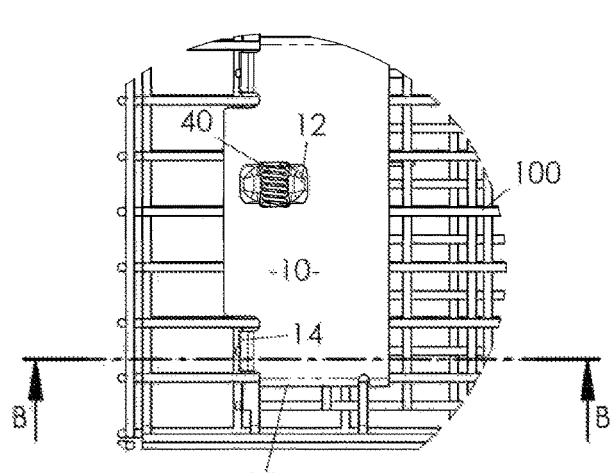
FIG. 4 is a top, detail, view of a front area of the excluder of FIG. 3.
Figure 6:
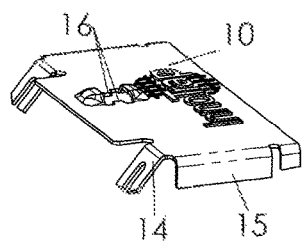
FIG. 6 is a top perspective view of a top plate in a pre-assembled condition.
Figure 7:
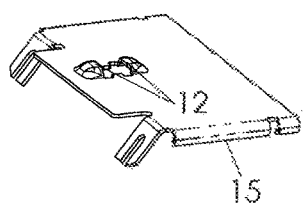
FIG. 7 is the top plate of FIG. 6 in an intermediate assembled condition, with the associated cage not shown for clarity.
Figure 8:
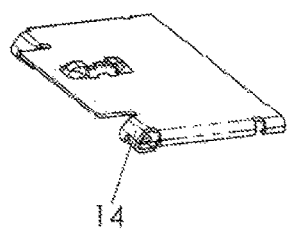
FIG. 8 is the top plate of FIG. 9 in a fully assembled condition, with the associated cage and door not shown for clarity.
Figure 10:
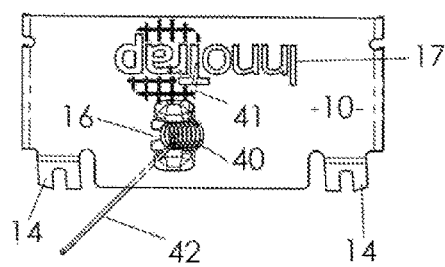
FIG. 10 is a top view of the top plate of FIG. 7, with a door spring in an intermediate assembly step upon the top plate.

A top plate of an excluder is typically attached at the ceiling, atop the ceiling as shown, primarily or entirely for display of product branding information. FIG. 10 shows an exemplary brand logo 17. A feature of the invention includes use of the top plate for further functions beyond informational. One such feature is as a secure structure to attach the door to the enclosure. Enclosure 100 may also be referred to as a wire cage, or cage, in this disclosure without limiting it thereto. Flange 15, FIG. 4, is crimped from a pre-assembled condition, FIG. 6 to a crimped condition, FIG. 7 (cage not shown). As seen in FIG. 5A top plate flange 14 extends laterally, into the page of FIG. 5A, and is crimped around door hinge wire 32. See also FIG. 8. Flange 14 is rotationally fixed to the enclosure via the top plate attachment, specifically to wire cage 100 in the illustrated embodiment. Both flanges 14 and 15 contribute to attaching or fitting the top plate to the cage while flange 14 has the added function of creating a secure hinge for door 30. Door 30 thus has minimal free play to move up or down or to rotate with respect to the view of FIG. 4. The free play is only that required to prevent binding of flange 14 about hinge wire 32 while the wire, and thus door, is free to rotate against the guide formed by flange 14. As seen in FIG. 4 top plate 10 is held from translating upon the cage roof 101 by close fits of respective flanges 14 and 15 to the wire mesh opening of cage 100. Further, flanges 14 fit closely to the mesh of door 30. Flanges 14 thus form a high quality pivotal attachment of the door to the enclosure. These close fits translate to tight control of the position of door 30 on the enclosure. Therefore the door will not contact nor hang up on the sides of the enclosure and it will operate smoothly and reliably.

Figure 9:
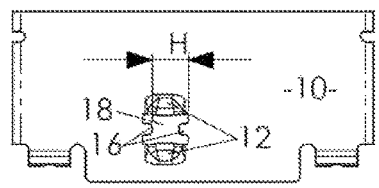
FIG. 9 is a top view of the top plate of FIG. 8.

Spring 40 is a torsion spring configured to bias door 30 to the closed position. It includes spring arms 41 and 42 extending radially from a coil of the spring. An excluder torsion spring commonly is held at a mandrel which supports and positions the spring from within the spring coil. In prior excluders the mandrel comprises a wire of the cage. Such a wire must be a separate part that is welded onto the cage; or the wire is cut, bent, and re-bent, to enable the wire mandrel structure to axially pass through the coil. In the present invention the mandrel is integrated into top plate 10. Tabs 16 extend laterally to describe a mandrel that fits axially within the coil of the spring. The spring is held in opening 18, FIG. 9, of the top plate with tabs 16 extending into the opening and axially into each end of the coil, FIG. 11. Opening 18 is preferably elongated laterally, sideways in FIG. 9. The tabs are truncated and spaced apart to form an elongated gap between them.

For low friction function the spring coil should be close as practical to the door hinge. In FIG. 5A door hinge 32 abuts cage ring wire 102, a ring wire being a wire that extends around a perimeter of the cage or enclosure. Arrows 31 show a distance between this ring wire and the spring coil. This distance is less than the diameter of the coil, less than one half as shown. This structure thus holds the coil near to the ring wire. Specifically the distance is less than 0.01 inch as shown, while other distances may be used. While the spring coil is near to the ring wire, it is spaced from the ring wire wherein the coil does not surround the ring wire; such surrounding would require cutting the ring wire as discussed earlier regarding prior excluder designs. Similarly cage ring wire 102 is held adjacent to door hinge wire 32. A result of this proximity is the rotation centers of the spring and door are adjacent and angle between the extended lengths of lower leg 42 and door 30 is less than 10 degrees, FIG. 5. Arm 41 will have minimal sliding against door 30 and the resulting low friction maintains a reliable door-closing action.

Figure 5:
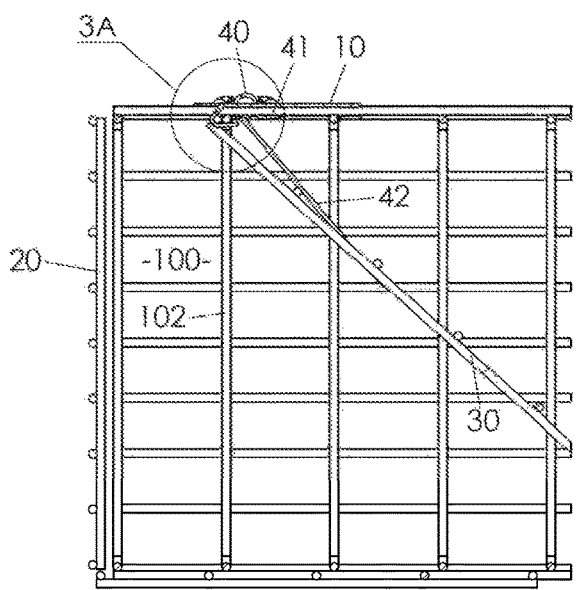
FIG. 5 is a side elevation, front detail, view of the excluder of FIG. 3.
Figure 12:
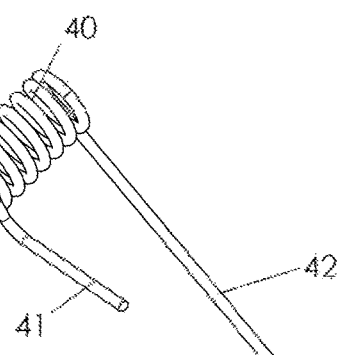
FIG. 12 is a perspective view of a door spring.
Figure 11:
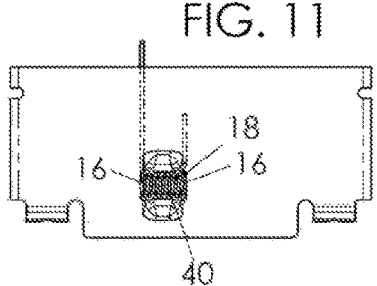
FIG. 11 is the view of FIG. 9 with the spring in an assembled condition.

FIG. 12 represents an installed condition of the spring with the arms in the pre-loaded operative position of FIG. 5. The coil windings of the spring are loose and therefore separated or spaced as shown. This is in contrast with typical torsion spring wherein the coils are adjacent to each other. With such spacing the spring functions selectively as a compression spring at the coil. The purpose of the compression function is seen in FIG. 10 showing an intermediate assembly step or condition of the spring. The coil is compressed and the spring is angled to enable its fitment into the elongated gap between tabs 16. The compressed height of the coil is at most the span of dimension H, FIG. 9. This span is from an end of opening 18 to the distal end of the opposed tab 16. The coil end (left end in the view of FIG. 10) is able to pass beside the tab end. Upper spring leg 41 and lower spring leg 42 of FIG. 10 are relatively angled to be in the free position wherein there is no pre-load on the spring as shown. In FIG. 11 the spring coil is then allowed to expand its axial height to fill the length of opening 18 as the spring is rotated to its operative orientation. The spring is fully assembled to the top plate in FIG. 11. Spring 40 has its legs angled to the installed position in FIG. 11 as is the case when door 30 (see FIG. 5A) is engaged. In FIG. 5A leg 41 presses top plate 10 from below. More generally arm 41 presses an element of the assembly linked to the enclosure to enable a torque via the spring between the door and the enclosure. The spring may be installed to top plate 10 either before or after the top plate is installed to the enclosure.

The spring support and assembly structures described above enable a simplified mandrel that requires no manipulation thereof. Tabs 16 provide a mandrel to form an axial support for the spring coil. Top plate 10 preferably includes protective humps 12 beside and adjacent to the coil. These humps will ensure that the spring cannot be pulled off or knocked inward from any impacting objects during use or transport. As seen in FIG. 5A humps 12 are at least ⅔ the diametric height (DH) of the coil above the top plate in the side view shown.

While the particular forms of the invention have been illustrated and described, it will be apparent that various modifications can be made without departing from the spirit and scope of the invention. It is contemplated that elements from one embodiment may be combined or substituted with elements from another embodiment.

What is claimed is:

1. A one way door animal excluder comprising:
   an elongated enclosure provided with openings at a front end and a rear end, respectively, and a ceiling, the enclosure defining a passageway for an animal;
   a door pivotally attached to the ceiling of the enclosure, the door being movable between an open position that allows passage of a target animal through the passageway and a closed position that prevents passage of the target animal through the passageway;
   a torsion spring configured to engage the door, the torsion spring including a coil and first and second arms, respectively, extending radially from the coil; and
   a top plate secured to the ceiling of the enclosure;
   wherein the coil is held to the top plate such that the torsion spring biases the door toward the closed position,
   wherein the top plate is provided with a plurality of flanges, and wherein at least one of the plurality of flanges is crimped to the ceiling of the enclosure to secure the top plate to the enclosure,
   wherein the top plate comprises a mandrel formed by at least two opposed tabs extending into an opening provided in the top plate, the at least two tabs being truncated and having an elongated gap there between, and
   wherein the at least two opposed tabs extend into opposed open ends of the coil such that the spring is held to the top plate by the mandrel.

2. The one way door animal excluder of claim 1, wherein the coil is axially compressible to a height that is not greater than a distance between an edge of the opening provided in the top plate and a distal end of an opposing one of the at least two opposed tabs.

3. The one way door animal excluder of claim 2, wherein the coil is axially expandable such that the coil fills a distance between opposing edges of the opening provided in the top plate.

4. The one way door animal excluder of claim 3, wherein the coil comprises at least two adjacent windings that are spaced apart from each other when the coil fills the distance between the opposing edges of the opening provided in the top plate.

5. The one way door animal excluder of claim 1, wherein the top plate includes a protective hump adjacent to the coil, said hump extending outwardly relative to the ceiling beside the coil.

6. The one way door animal excluder of claim 5, wherein the hump extends outwardly a distance that is at least ⅔ of a diametric height of the coil extending above the top plate.

7. The one way door animal excluder of claim 1, wherein at least one of the plurality of flanges is crimped to both of a wire of the enclosure and a hinge wire of the door such that both of the respective wires are held adjacent to each other by the at least one of the plurality of flanges.

8. The one way door animal excluder of claim 7, wherein the coil is held such that it is near to the wire of the enclosure and a distance between the coil and the wire of the enclosure is less than a diameter of coil.

9. The one way door animal excluder of claim 8, wherein the distance between the coil and the wire of the enclosure is less than one half of the diameter of the coil.

10. A one way door animal excluder comprising:
    an elongated enclosure provided with openings at a front end and a rear end, respectively, and a ceiling, the enclosure defining a passageway for an animal;
    a door pivotally attached to the ceiling of the enclosure, the door being movable between an open position that allows passage of a target animal through the passageway and a closed position that prevents passage of the target animal through the passageway;
    a torsion spring attached to the enclosure to engage the door such that the door is biased toward the closed position, the spring including a coil and first and second arms, respectively, extending radially from the coil; and
    a top plate secured to the ceiling of the enclosure, the top plate including a plurality of flanges that are crimped to the ceiling to secure the top plate to the enclosure;
    wherein the enclosure comprises a wire and the door comprises a hinge wire, said wires being adjacent to each other at the ceiling of the enclosure,
    wherein the coil is spaced away from, but is near to, the wire of the enclosure,
    wherein a distance between the coil and the wire of the enclosure is less than a diameter of the coil, and
    wherein the top plate comprises a mandrel including at least two opposed tabs extending into an opening provided in the top plate, the at least two opposing tabs being truncated such that an elongated gap exists there between.

11. The one way door animal excluder of claim 10, wherein the coil is supported by the at least two opposed tabs and is held to the top plate by the mandrel.

12. The one way door animal excluder of claim 11, wherein the coil is axially compressible to a height that is not greater than a distance between an edge of the opening provided in the top plate and a distal end of an one of the at least two opposed tabs.

13. The one way door animal excluder of claim 12, wherein the coil is axially expandable such that the coil fills a distance between opposing edges of the opening provided in the top plate.

14. The one way door animal excluder of claim 10, wherein the door has an extended length away from the hinge wire, and wherein a lower one of the first and second arms of the spring extends away from the coil, the lower one of the first and second arms and the extended length of the door forming an angle of less than 10 degrees.

15. The one way door animal excluder of claim 10, wherein hinge wire comprises a hinge of the door, and wherein at least one of the plurality of flanges at least partially surrounds the hinge wire to retain the hinge wire such that the hinge wire and the door are free to rotate relative to a guide formed by the at least one of the plurality of flanges at least partially surrounding the hinge wire.

16. A one way door animal excluder comprising:
    an elongated enclosure provided with an opening at a front end and a rear end, respectively, and a ceiling, the enclosure defining a passageway for an animal;
    a door pivotally attached to the ceiling of the enclosure, the door being movable between an open position that allows passage of a target animal through the passageway and a closed position that prevents passage of the target animal through the passageway, the door including a hinge wire that is held in position relative to the enclosure and is free to rotate in relation to the enclosure;
    a torsion spring attached to the enclosure configured to engage with and bias the door toward the closed position via torque between the door and the enclosure, the spring including a coil and first and second arms, respectively, extending radially from the coil; and a top plate secured to the ceiling of the enclosure, the top plate comprising a plurality of flanges at least one of which is crimped to the ceiling to secure the top plate to the enclosure;

wherein at least another one of the plurality of flanges at least partially surrounds and guides the hinge wire such that the door is rotatable about the hinge wire at least partially surround by the at least another one of the plurality of flanges.

17. The one way door animal excluder of claim 16, wherein the at least another one of the plurality of flanges that at least partially surrounds the hinge wire is also crimped around a wire of the enclosure.

18. The one way door animal excluder of claim 16, wherein the top plate comprises a mandrel formed by at least two tabs extending into an opening provided in the top plate, the at least two tabs being truncated and having an elongated gap there between, and wherein the at least two tabs extend into opposed open ends of the coil such that the spring is held to the top plate by the mandrel, and the coil is supported by the tabs.

\* \* \* \* \*